W. Duncan,
Horseshoe-Calk Sharpener.
N° 82,813. Patented Oct. 6, 1868.
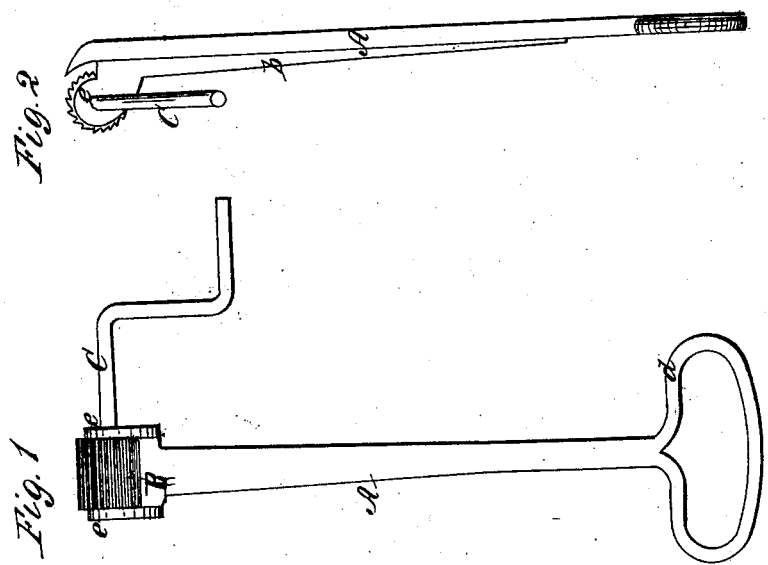
Witnesses:
Jno. A. Ellis
J. W. Mister
Inventor:
W. Duncan,
per T. H. Alexander
Atty

United States Patent Office.

WILLIAM DUNCAN, OF VINTON, IOWA.

*Letters Patent No. 82,813, dated October 6, 1868.*

IMPROVEMENT IN HORSE-SHOE-CALK SHARPENERS.

*The Schedule referred to in these Letters Patent and making part of the same.*

TO ALL WHOM IT MAY CONCERN:

Be it known that I, WILLIAM DUNCAN, of Vinton, in the county of Benton, and State of Iowa, have invented certain new and useful Improvements in Horse-Shoe-Calk Sharpeners; and I do hereby declare that the following is a full, clear, and exact description thereof, reference being had to the accompanying drawings, and to the letters of reference marked thereon, which form a part of this specification, in which—

Figure 1 represents a front view.

Figure 2, a side elevation.

Figure 3, a detached view of the crank, showing its projection; and

Figure 4 a side view of the cutting-wheel detached.

The nature of this invention consists in the employment of a corrugated cutting-wheel, in combination with a spring and shank, arranged substantially as and for the purpose hereinafter set forth.

To enable others skilled in the art to make and employ my invention, I will now describe its construction and operation.

A designates a metal bar or rod, furnished at one end with a handle, $d$. The opposite end of said bar is curved and sharpened, and also expanded or made wide, as represented in fig. 2. On one side of this bar is fastened or soldered the spring $b$, as seen in fig. 2. The upper end of said spring is provided with ears, $e\ e$. Said ears are furnished with holes, which are cut or formed with slots, the object of which will be seen hereafter.

B designates the cutting-wheel, which is corrugated on its outer surface or periphery. Said corrugations are made sharp, and formed, as seen in figs. 2 and 4, for the purpose of cutting or sharpening the calks of horse-shoes. This wheel is provided with a hole passing through its centre, and at each end of said hole is cut a bevelled groove or slot, the object of which will be more apparent hereafter.

C represents the crank, which is furnished with a projection, bevelled to correspond with the grooves in wheel B. The object of so constructing the crank is to secure the wheel firmly in place on said crank while in motion, and also allow of its being made adjustable. It will be remarked that the wheel B is made of steel.

The operation of my machine is as follows:

The calk to be sharpened is inserted between the sharp end of bar A and cutting-wheel B, and motion given to the crank C, and by the revolving or motion of the wheel, the calk will be pressed against the sharp edge of the bar A, and the calk will thus be sharpened.

I do not claim anything embraced in the patent of Hays, Duncan, and Bowen; but

What I claim as new, and desire to secure by Letters Patent, is—

The shank or bar A, spring $b$, and cutting-wheel B, all combined and operating substantially in the manner and for the purpose specified.

In testimony that I claim the foregoing as my own, I affix my signature in presence of two witnesses.

WILLIAM DUNCAN.

Witnesses:
   B. F. SMITH,
   A. EDMONDS.